United States Patent [19]

Chiu

[11] Patent Number: 5,639,146

[45] Date of Patent: Jun. 17, 1997

[54] WHEEL COVER MOUNTING STRUCTURE

[76] Inventor: Hsien-Yu Chiu, 3F No. 128. Ku Ling St.,, 100 Taipei, Taiwan

[21] Appl. No.: 604,503

[22] Filed: Feb. 21, 1996

[51] Int. Cl.⁶ .................................................. B60B 7/10
[52] U.S. Cl. ...................... 301/37.34; 301/37.36
[58] Field of Search ............................ 301/37.1, 37.31, 301/37.34, 37.35, 37.36

[56] References Cited

U.S. PATENT DOCUMENTS

| 4,895,414 | 1/1990 | Fleming et al. | 301/37.34 X |
| 5,366,278 | 11/1994 | Brumfield | 301/37.34 |
| 5,509,725 | 4/1996 | Chiu | 301/37.36 X |

FOREIGN PATENT DOCUMENTS

| 287803 | 10/1988 | European Pat. Off. | 301/37.36 |
| 3134303 | 6/1988 | Japan | 301/37.36 |

Primary Examiner—Russell D. Stormer
Attorney, Agent, or Firm—Bacon & Thomas

[57] ABSTRACT

A wheel cover mounting structure includes a wheel cover having a plurality of locating blocks spaced at an inner side around the periphery, and a plurality of clamps fastened to the locating blocks to secure the wheel cover to the wheel, wherein each of the locating blocks defines with the wheel cover a receiving chamber and has two retaining slots at two opposite sides of the receiving chamber. Each of the clamp has a smoothly upwardly curved front end inserted through the receiving chamber of one locating block and hooked on the periphery of the wheel, and two retaining rods respectively inserted into the retaining slots of the respective locating block and secured thereto.

6 Claims, 5 Drawing Sheets

1

WHEEL COVER MOUNTING STRUCTURE

BACKGROUND OF THE INVENTION

The present invention relates to a wheel cover mounting structure which is comprised of a wheel cover having locating blocks around the periphery, and a plurality of clamps respectively inserted into a respective receiving chamber in each locating block and hooked on the periphery of the wheel to secure the wheel cover to the wheel.

The wheel of a motor vehicle is generally covered with a wheel cover. Conventionally, the wheel cover is fastened to the wheel by metal or plastic hook means. Recently, steel wire rings are commonly used to fasten wheel covers to wheels. When a steel wire ring is used, it is fastened to a recessed wall portion at an outer side of the wheel to hold down the wheel cover. However, because the wheels vary with the models of the motor vehicles, different steel wire rings and other metal or plastic fittings or fastening devices shall be used for different wheels. Furthermore, if a wheel has no recessed wall portion or similar structure for loading a steel wire ring, then metal or plastic hooks and steel wire rings are useless other and additional metal or plastic fittings or fastening devices must be used to fasten the wheel cover. When additional fittings or fastening devices are provided, the packing and transportation cost of wheel covers is correspondingly increased. Furthermore, the tooling apparatus for making conventional plastic wheel covers are complicated, thereby preventing the manufacturing cost of the wheel covers to be reduced to a satisfactory level.

U.S. patent application No. 08/341,950, filed on Nov. 16, 1994, entitled "WHEEL ASSEMBLY FOR MOTOR VEHICLES", invented by the present inventor, eliminates the aforesaid drawbacks. The present invention provides a wheel cover mounting structure which also eliminates the aforesaid drawbacks.

SUMMARY OF THE INVENTION

It is one object of the present invention to provide a wheel cover mounting structure which is suitable for mass production, thereby lowering manufacturing cost. It is another object of the present invention to provide a wheel cover mounting structure which permits the wheel cover to be fastened to any of a variety of wheels of different specifications. It is still another object of the present invention to provide a wheel cover which is integrally molded from plastics, thereby lowering the racking and transportation cost.

To achieve the aforesaid and other objects, there is provided a wheel cover mounting structure which comprises a wheel cover, a plurality of locating blocks raised from the wheel cover at an inner side around the periphery, each of the locating blocks defining with the wheel cover a respective receiving chamber and having two retaining slots at two opposite sides of the respective receiving chamber, and a plurality of clamps respectively fastened to the locating blocks and hooked on the periphery of the wheel to hold the wheel and the wheel cover together, each of the clamps having a smoothly upwardly curved front end inserted through the receiving chamber of one locating block and hooked on the periphery of the wheel, and two retaining rods respectively inserted into the retaining slots of the respective locating block and secured thereto. The locating blocks are integrally molded on the wheel cover, and therefore the packing and transportation cost of the wheel cover mounting structure is greatly reduced.

DETAILED DESCRIPTION OF THE PREFERRED EMBODIMENT

Figure 1:
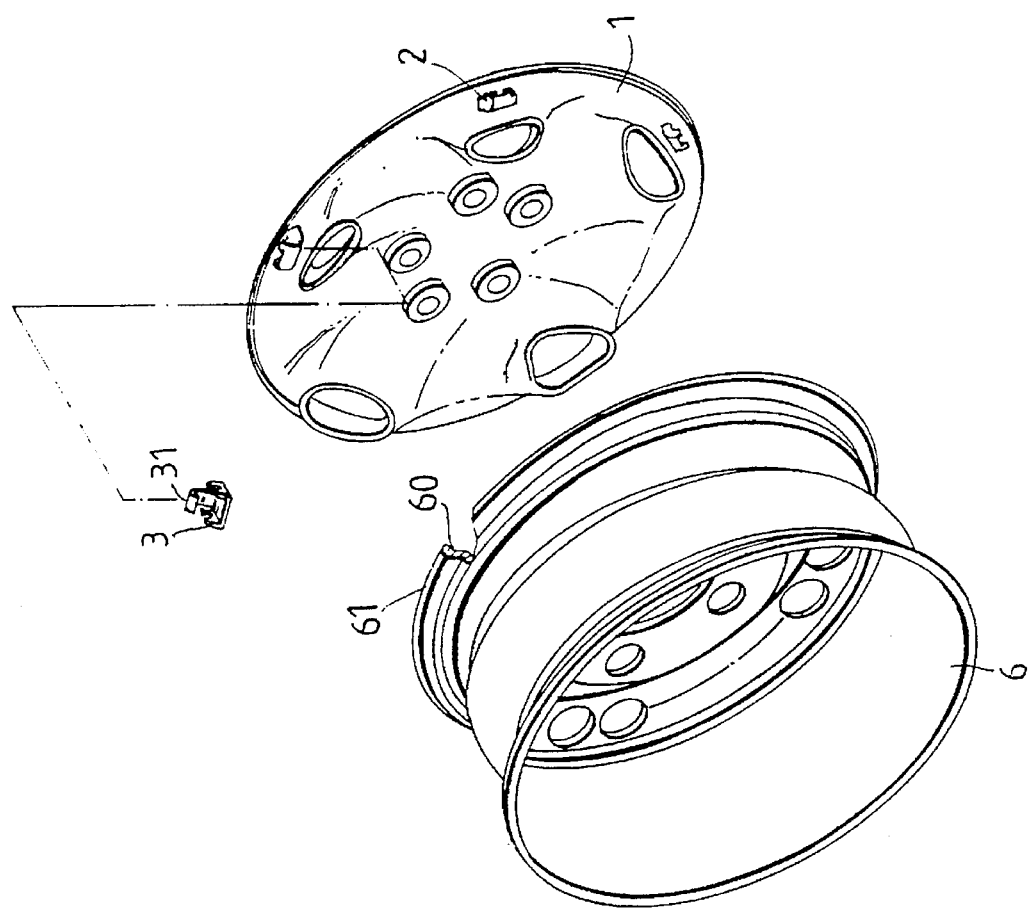
FIG. 1 is an exploded view of a wheel cover mounting structure according to the present invention.

Referring to FIG. 1, a wheel cover mounting structure in accordance with the present invention is generally comprised of a wheel cover 1, a plurality of locating blocks 2, a plurality of clamps 3, and a wheel 6.

Figure 3:
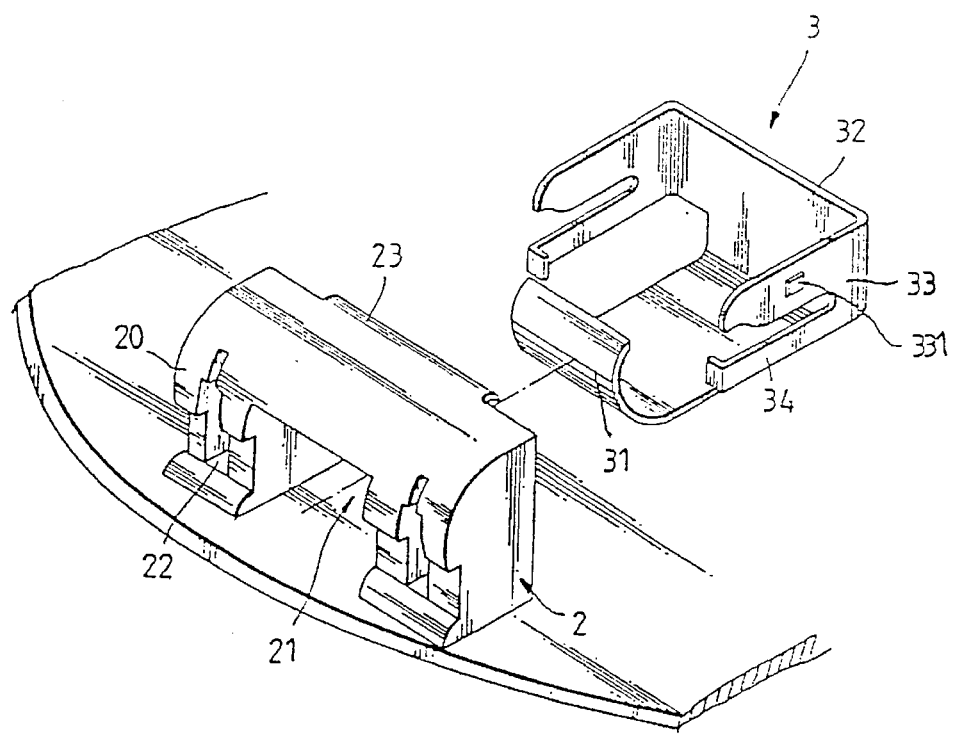
FIG. 3 is an exploded view of FIG. 2.
Figure 5:
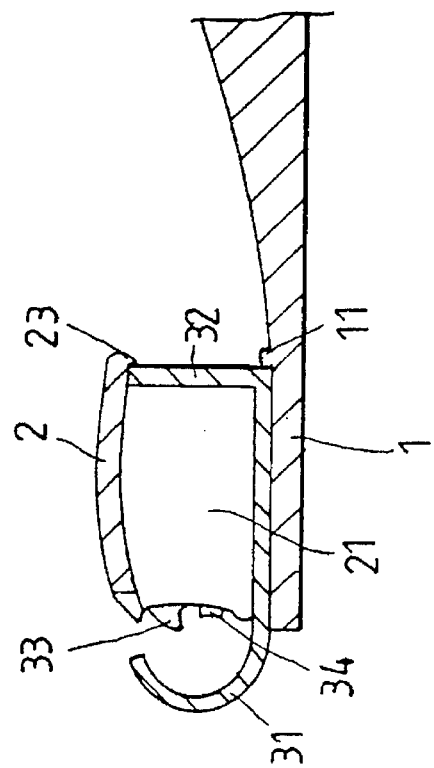
FIG. 5 is a sectional view taken along line V—V of FIG. 2.
Figure 4:
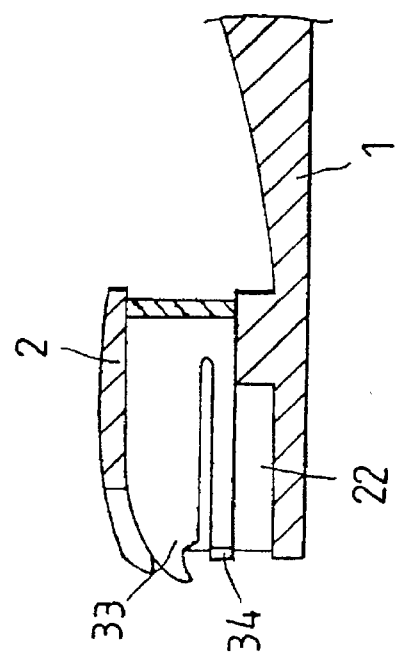
FIG. 4 is a sectional view taken along line IV—IV of FIG. 2.

Referring to FIGS. 1 and 3, the wheel cover 1 has a circular shape, a plurality of locating blocks 2 raised from the inner side around the border. Each of the locating blocks 2 has a projecting portion 20 corresponding to the smoothly curved inner peripheral wall portion 60 of the wheel 6. When the wheel cover 1 is covered on the wheel 6, the projecting portion 20 of each of the locating blocks 2 is forced into engagement with the peripheral wall portion 60 of the wheel 6. The locating blocks 2 each define with the inner side of the wheel cover 1 a respective receiving chamber 21 for receiving one clamp 3. Each of the locating blocks 2 further comprises two retaining slots 22 at two opposite sides of the respective receiving chamber 21. The width of each of the retaining slots 22 gradually increasing toward the outside.

Figure 2:
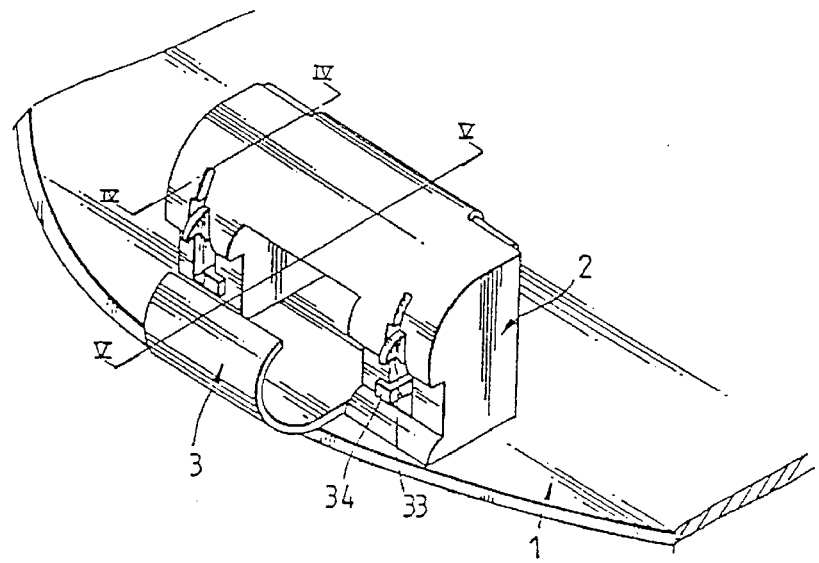
FIG. 2 is a partial view on an enlarged scale of the wheel cover mounting structure shown in FIG. 1, showing one clamp fastened to one locating block of the wheel cover.

Referring to FIGS. 2 and 3, the clamp 3 comprises a smoothly upwardly curved front end 31 inserted through the receiving chamber 21 of one locating block 2 and hooked on the smoothly curved outer peripheral wall portion 61 of the wheel 6, an upright back wall 32, two opposite retaining rods 33 and two opposite locating hooks 34 respectively and perpendicularly extending from the upright back wall 32 at two opposite sides. Each of the retaining rods 33 has a raised portion 331 at an outer side. During the installation of the clamp 3, the smoothly upwardly curved front end 31, the retaining rods 33 and the locating hooks 34 are respectively inserted into the receiving chamber 21 and the retaining slots 22 of the respective locating block 2, permitting the upright back wall 32 to be stopped at the back side of the respective locating block 2, and permitting the front ends of the retaining rods 33 and the locating hooks 34 to partially project out of the respective retaining slots 22. Furthermore, the locating block 2 has a projecting portion 23 at the back side for stopping against the upright back wall 32 of the respective clamp 3. The wheel cover 1 has a plurality of ribs 11 raised from the inner side corresponding to the projecting portion 23 of each locating block 2 for stopping at the back side of the upright stop wall 32 of each clamp 3.

Figure 6:
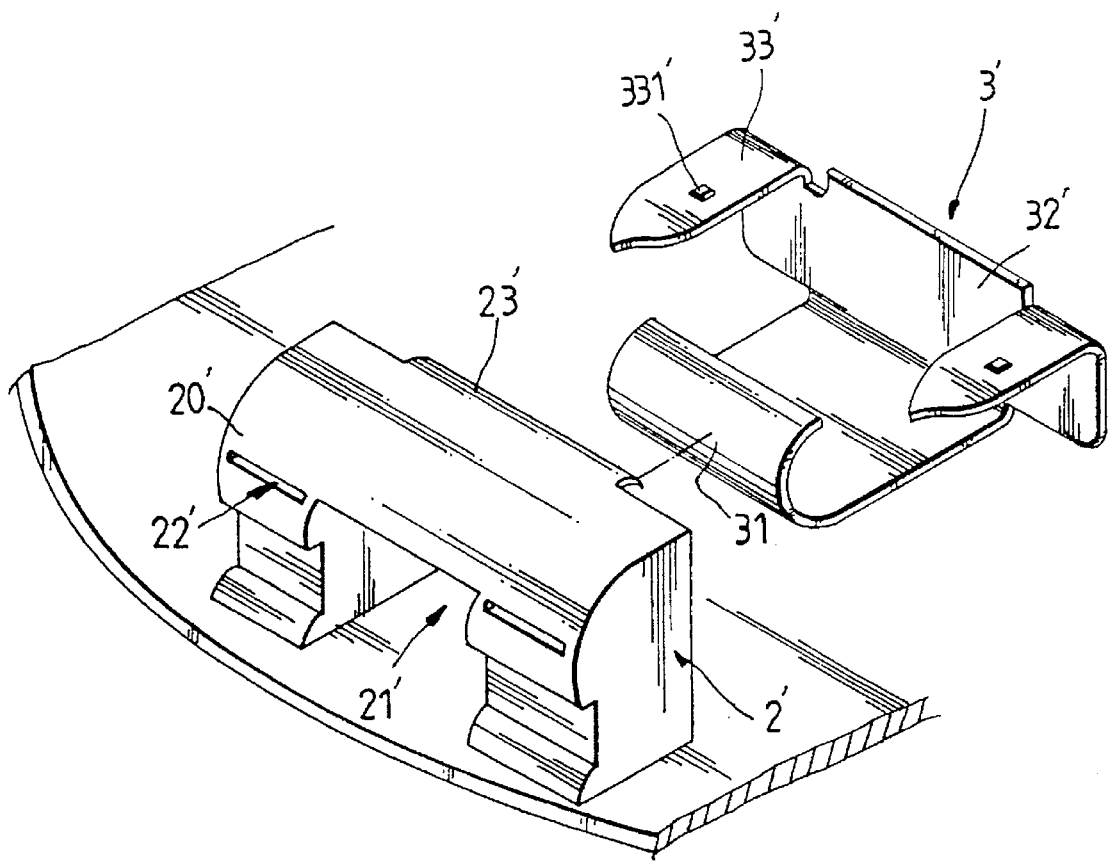
FIG. 6 is an exploded view showing an alternate form of the clamp according to the present invention.

Referring to FIG. 6, the locating block referenced by 2', and the clamp, referenced by 3' is integrally made from metal by stamping, and comprises a smoothly upwardly curved front end 31' for insertion through the receiving chamber 21' of one locating block 2', an upright back wall 32', two retaining rods 33' extending forward from the upright back wall 32' at two opposite sides. Each of the retaining rods 33' has a raised portion 331' at the top. During the installation of the clamp 3', the smoothly upwardly curved front end of each clamp 3' is inserted through the receiving chamber 21' of each locating block 2' and hooked on the smoothly curved outer peripheral wall portion 61 of the wheel 6, the upright back wall 32' is stopped against the back of the respective locating block 2', and the retaining rods 33' are respectively inserted through the respective retaining slots 22' with the respective raised portions 331' stopped against the inside wall of the respective retaining slots 22'.

Figure 7:
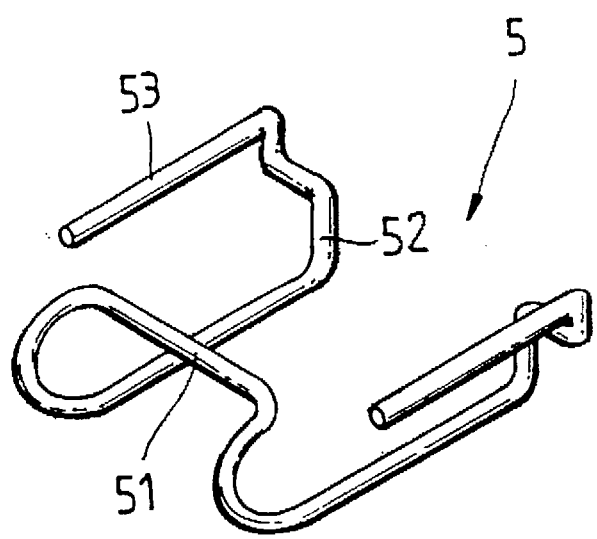
FIG. 7 shows another alternate form of the clamp according to the present invention.

Referring to FIG. 7, the clamp, referenced by 5, is made from a resilient steel wire rod having a hooked portion 51 transversely disposed at the front side for insertion through the receiving chamber 21 of one locating block 2 to hook on the smoothly curved outer peripheral wall portion 61 of the wheel 6, two forward retaining tails 53 for fastening to the respective retaining slots 22, and two stop portions 52 connected between the retaining tails 53 and two opposite ends of the hooked portion 51 for stopping at the back side of the respective locating block 2 (see also FIG. 3).

It is to be understood that the drawings are designed for the purposes of illustration only, and are not intended as a definition of the limits and scope of the invention disclosed.

What is claimed is:

1. A wheel cover mounting structure comprising:

a wheel cover having a circular profile;

at least one locating block respectively formed on said wheel at an inner side adjacent to a periphery thereof and defining with said wheel cover a respective receiving chamber, each of said at least one locating block comprising two retaining slots at two opposite sides of the respective receiving chamber, the size of each of said retaining slots being relatively smaller than that of said receiving chamber; and at least one clamp respectively fastened to said at least one locating block to secure said wheel cover to the periphery of a wheel, each of said at least one clamp having a first part inserted through the receiving chamber of one locating block and forced into engagement with the periphery of the wheel, and a second part inserted into the retaining slots of the respective locating block and secured thereto.

2. The wheel cover mounting structure of claim 1 wherein the first part of said at least one clamp comprises a smoothly curved front end inserted through the receiving chamber of one locating block and hooked on the smoothly curved outer peripheral wall portion of the wheel, an upright back wall stopped against the respective locating block at a back side thereof, and the second part includes two opposite forward retaining rods perpendicularly extending from said upright back wall at two opposite sides and respectively inserted into the retaining slots of the respective locating block and secured thereto.

3. The wheel cover mounting structure of claim 2 wherein each of said at least one locating block has a respective top projecting portion stopped against the upright wall of the respective clamp.

4. The wheel cover mounting structure of claim 3 wherein said wheel cover has at least one rib at an inner side corresponding to the top projecting portion of the respective locating block and stopped against the respective clamp to hold it into engagement with the top projecting portion of the respective locating block.

5. The wheel cover mounting structure of claim 2 wherein each of said retaining rods has at least one raised portion stopped against the respective locating block inside the respective retaining slot.

6. The wheel cover mounting structure of claim 2, wherein each of said at least one clamp further comprises two locating hooks perpendicularly extending from the respective upright back wall at two opposite sides and respectively inserted through the retaining slots of the respective locating block and hooked therein.

* * * * *